(12) United States Patent
Zhang

(10) Patent No.: US 7,598,710 B2
(45) Date of Patent: Oct. 6, 2009

(54) BATTERY CHARGER WITH TEMPERATURE CONTROL

(75) Inventor: Zhengwei Zhang, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 11/636,337

(22) Filed: Dec. 8, 2006

(65) Prior Publication Data

US 2008/0136377 A1 Jun. 12, 2008

(51) Int. Cl.
*H02J 7/00* (2006.01)
*H02J 7/04* (2006.01)
*G05F 1/00* (2006.01)

(52) U.S. Cl. .............. 320/137; 320/128; 320/153; 323/273

(58) Field of Classification Search .......... 320/128, 320/130, 134, 136, 137, 153, 144; 323/281, 323/313, 315, 316, 369; 327/53, 56, 66, 327/371, 373, 512, 534, 535, 536, 537, 539, 327/541

See application file for complete search history.

(56) References Cited

U.S. PATENT DOCUMENTS

| | | | | |
|---|---|---|---|---|
| 5,140,269 A | * | 8/1992 | Champlin | 324/433 |
| 5,708,348 A | * | 1/1998 | Frey et al. | 320/145 |
| 5,751,139 A | * | 5/1998 | Jordan et al. | 323/222 |
| 5,789,903 A | * | 8/1998 | Young et al. | 320/161 |
| 5,945,806 A | * | 8/1999 | Faulk | 320/127 |
| 6,184,659 B1 | * | 2/2001 | Darmawaskita | 320/139 |
| 6,310,467 B1 | * | 10/2001 | Sauer | 323/273 |
| 6,456,044 B1 | * | 9/2002 | Darmawaskita | 320/139 |
| 6,836,095 B2 | * | 12/2004 | Fogg | 320/128 |
| 7,176,654 B2 | * | 2/2007 | Meyer et al. | 320/110 |
| 7,180,268 B2 | * | 2/2007 | Denning et al. | 320/134 |
| 7,202,651 B2 | * | 4/2007 | Chapuis | 323/283 |
| 7,239,115 B2 | * | 7/2007 | Chapuis et al. | 323/282 |
| 7,249,267 B2 | * | 7/2007 | Chapuis | 713/300 |
| 2005/0212484 A1 | * | 9/2005 | Denning et al. | 320/128 |
| 2005/0212489 A1 | * | 9/2005 | Denning et al. | 320/134 |
| 2005/0216220 A1 | * | 9/2005 | Kim | 702/130 |
| 2005/0269992 A1 | * | 12/2005 | Lai et al. | 320/134 |
| 2006/0103354 A1 | * | 5/2006 | Gubbins | 320/128 |
| 2007/0024243 A1 | * | 2/2007 | Liu et al. | 320/134 |
| 2007/0029975 A1 | * | 2/2007 | Martin et al. | 320/134 |
| 2007/0075682 A1 | * | 4/2007 | Guang et al. | 320/128 |

* cited by examiner

*Primary Examiner*—Akm E Ullah
*Assistant Examiner*—M'Baye Diao
(74) *Attorney, Agent, or Firm*—Perkins Coie LLP

(57) ABSTRACT

A battery charger integrated circuit with temperature control is disclosed that includes a temperature sensor circuit and a charging current generator circuit. Upon receiving a temperature reading voltage (VDT), the temperature sensing circuit is operable to generate a second reference voltage ($V_{REF}$) that is a function of the first reference voltage ($V_{REF1}$). The charging current generator circuit generates and continuously adjusts a reference current ($I_1$) and a charging current ($I_{OUT}$) according to the second reference voltage ($V_{REF}$). Whenever the temperature reading voltage (VDT) exceeds the first reference voltage, the temperature sensor circuit is operable to adjust the second reference voltage ($V_{REF}$).

18 Claims, 3 Drawing Sheets

BATTERY CHARGER WITH TEMPERATURE CONTROL

FIELD OF THE INVENTION

The present invention relates generally to the field of electronic circuits. More particularly, the present invention relates to battery charger integrated circuit.

BACKGROUND

It is a common experience that when charging a battery, the battery charger integrated circuit (IC) that generates the charging current tends to overheat. The rise in temperature is caused by the IC power consumption in form of heat dissipation of the charging current. Naturally, when the charging current is reduced, the heat is also reduced. Over the years, there have been many attempts to achieve an optimal charging current value that effectively charges the battery and does not overheat battery charger IC at the same time. Some of these attempts seem to be either too complicated or too expensive. Because most of the rechargeable batteries are used in consumer electronic products, the cost and the size of the battery charger IC are important factors for the electronics manufacturers.

The present invention provides an effective, small-sized, and inexpensive circuit and a method to achieve both effective charging and overheating prevention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to different embodiments of the invention, examples of which are illustrated in the accompanying drawings. While the invention will be described in conjunction with these different embodiments, it will be understood that they are not intend to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of the ordinary skill in the art that the present invention may be practiced without these specific details. In other instances, well-known methods, procedures, components, and circuits have not been described in detail so as not to unnecessarily obscure aspects of the present invention.

Figure 1:
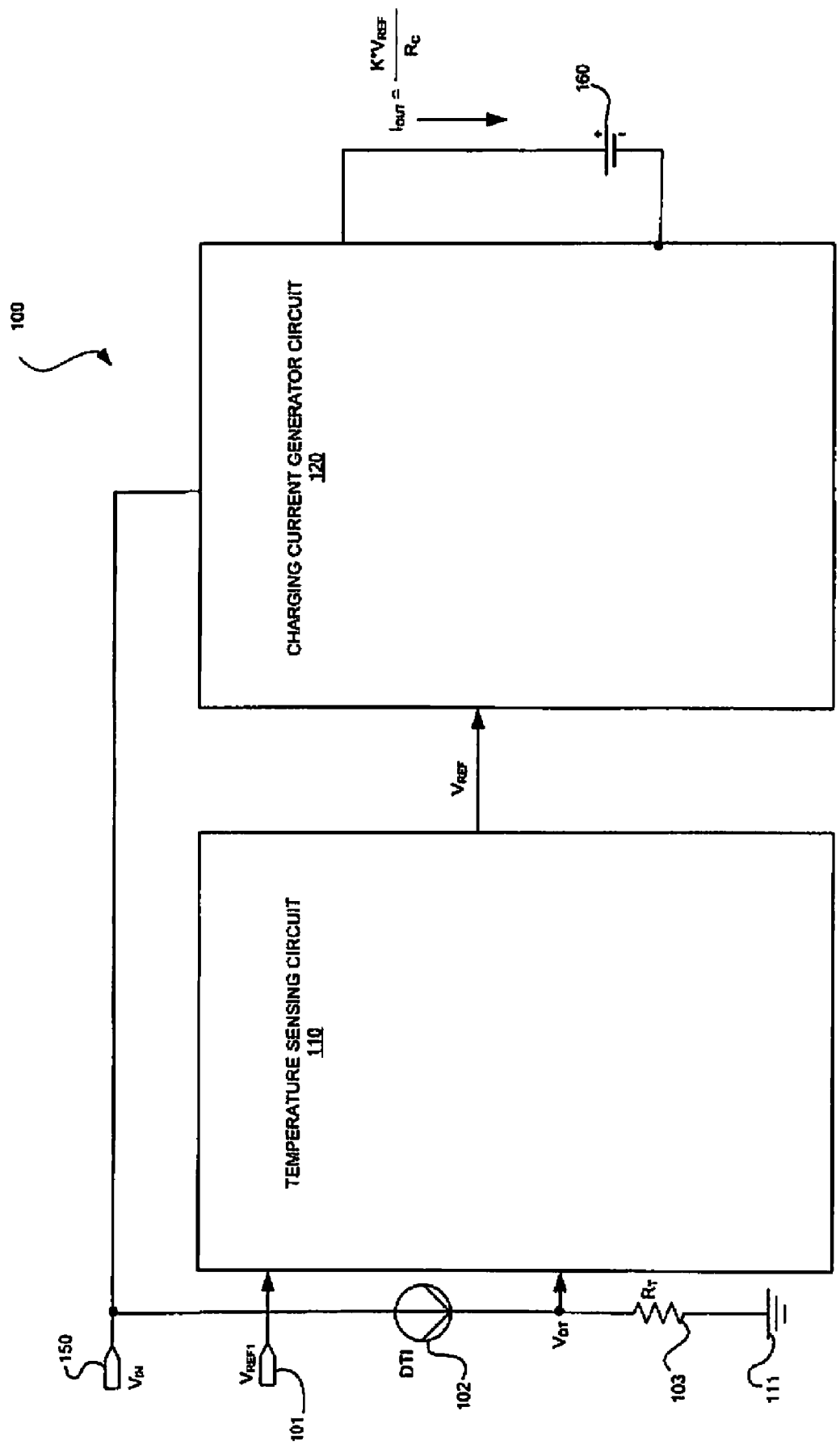
FIG. 1 illustrates a block diagram of a battery charger with temperature control that has a temperature sensing circuit and a charging current generator circuit in accordance with an embodiment of the present invention.

Now referring to FIG. 1, a block diagram of a battery charger integrated circuit (IC) with temperature control 100 in accordance with an embodiment of the present invention is illustrated. Battery charger integrated circuit with temperature control 100 includes a temperature sensing circuit 100 electrically coupled to a charging current generator circuit 120. Temperature sensing circuit 110 receives a first reference voltage (VREF1) 101 and reading temperature voltage (VDT) obtained from a direct temperature measurement of battery charger integrated circuit 100. In one embodiment, a die temperature indicator (DTI) 102 is used to measure the temperature of battery charger integrated circuit 100. The current generated by the die temperature indicator (DTI) 102 is proportional to the temperature of battery charger integrated circuit 100. This current is converted into temperature reading voltage (VDT) by a sensing resistor ($R_T$) 103. Temperature sensing circuit 110 compares the temperature reading voltage (VDT) with the first reference voltage ($V_{REF1}$) and generates a second reference voltage ($V_{REF}$). The second reference voltage ($V_{REF}$) is, in turn, fed to charging current generator circuit 120. Charging current generator circuit 120 uses the second reference voltage ($V_{REF}$) to generate a reference current (I1) and a charging current ($I_{OUT}$) for a battery 160 that is plugged into battery charger integrated circuit 100. In one embodiment, charging current ($I_{OUT}$) mirrors the reference current (I1) and is linearly proportional to second reference voltage ($V_{REF}$), e.g., $I_{OUT}$ is proportional to $V_{REF}$.

In operation, temperature sensing circuit 110 compares the temperature reading voltage (VDT) with first reference voltage ($V_{REF1}$). Whenever temperature reading voltage (VDT) surpasses first reference voltage ($V_{REF1}$), temperature sensing circuit 110 adjusts second reference voltage ($V_{REF}$). As such, charging current generator circuit 120 senses the adjustment in second reference voltage ($V_{REF}$) and changes the reference current ($I_1$) that, in turn, chances the charging current ($I_{OUT}$). In one embodiment, temperature sensing circuit 110 is constructed so that second reference voltage ($V_{REF}$) is linearly proportional to first reference voltage ($V_{REF1}$) and temperature reading voltage (VDT). In one embodiment, temperature sensing circuit 110 is constructed in such a manner that second reference voltage is a function of the first reference voltage ($V_{REF1}$) and the temperature reading voltage (VDT). It is noted that any relationship between first reference voltage ($V_{REF1}$) and second reference voltage ($V_{REF}$) so that the change in the temperature reading voltage (VDT) causes a change in second reference voltage ($V_{REF}$) that causes a change in the charging current ($I_{OUT}$) is within the scope of the present invention.

Figure 2:
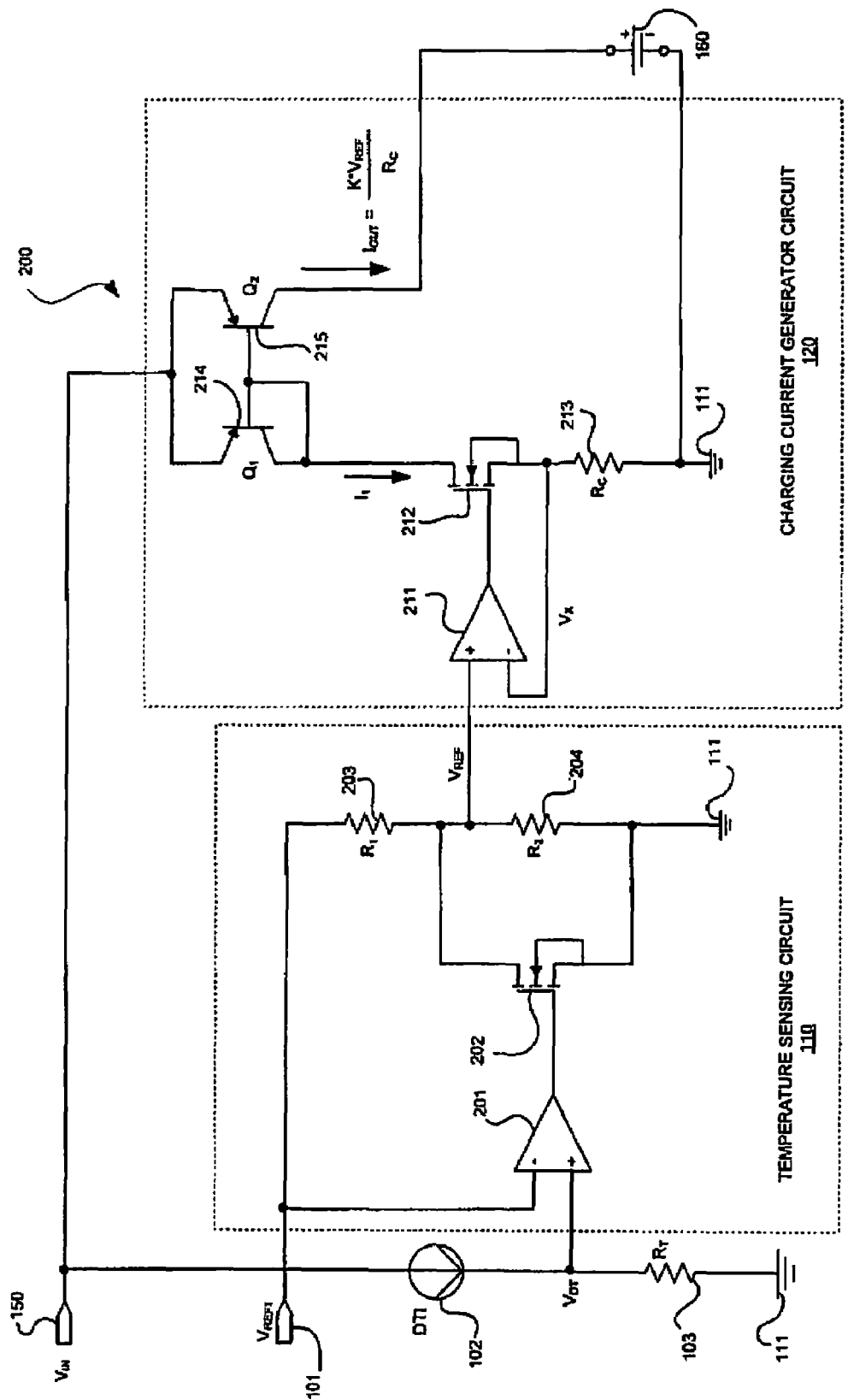
FIG. 2 illustrates a detailed schematic diagram of the battery charger with temperature control in accordance with an embodiment of the present invention.

Now referring to FIG. 2, the detailed schematic diagram of a battery charger integrated circuit with temperature control 200 in accordance with an embodiment of the present invention is illustrated. More particularly, temperature sensing circuit 110 includes a first error amplifier 201 that is electrically coupled to a first n-channel Metal Oxide Semiconductor (nMOS) 202 and a resistive divider circuit configured by a first resistor ($R_1$) 203 and a second resistor ($R_2$) 204. More particularly, first reference voltage ($V_{REF1}$) is electrically connected to an inverting terminal of first error amplifier 201. Die temperature indicator (DTI) 102 is connected between the inverting terminal and non-inverting terminal of first error amplifier 201. Sensing resistor ($R_T$) is connected to the non-inverting terminal of first error amplifier 201 and an electrical ground 111. The output terminal of first error amplifier 201 is electrically coupled to the gate of first nMOS transistor 202. First resistor ($R_1$) 203 is electrically connected to the inverting terminal of first error amplifier 201 and the drain of first nMOS transistor 202. Second resistor ($R_2$) 204 is electrically coupled between the drain and the source of first nMOS transistor 202.

Continuing with FIG. 2, charging current generator circuit 120 includes a second error amplifier 211 connected in series to a second nMOS transistor 212, and current mirror circuit configured by a first pnp bipolar junction transistor 214 and a second pnp bipolar junction transistor 215. More particularly, first pnp bipolar junction transistor 215 and second pnp bipolar junction transistor 215 form a current mirror with first pnp bipolar junction transistor 214. First pnp bipolar junction transistor 214 is connected as a diode and its collector connected to the drain of second nMOS transistor 212. The collector of second pnp bipolar junction transistor 215 is connected to battery 162. The bases of first pnp bipolar junction transistor 214 and second bipolar junction transistor are connected together and to an input voltage ($V_{IN}$) 150. The non-inverting terminal of second error amplifier 211 is connected to the source of second nMOS transistor 212 and to a resistor ($R_c$) 213. The other terminal of resistor ($R_c$) 213 is connected to electrical ground 111.

Referring again to FIG. 2, in operation, when reading temperature voltage (VDT) is less than first reference voltage ($V_{REF1}$), the output of first error amplifier 201 is LOW, causing first nMOS transistor 202 to be in cutoff mode. As a result, second reference voltage ($V_{REF}$) equals to first reference voltage ($V_{REF1}$) divided by the sum of first resistor ($R_1$) 203 and second resistor ($R_2$) 204 and multiplied by second resistor ($R_2$) 204. However, as the temperature of battery charger integrated circuit 200 increases, temperature reading voltage (VDT) also increases. If temperature reading voltage (VDT) exceeds first reference voltage ($V_{REF1}$), the ratio between first reference voltage ($V_{REF1}$) and second voltage reference ($V_{REF}$) will start to change. Second reference voltage ($V_{REF}$) is fed to charging current generator circuit 120. There, second reference voltage ($V_{REF}$) is compared with voltage ($V_x$) at the non-inverting terminal of second error amplifier 211. Second error amplifier 211 is configured such that it sets voltage (VX) equals to second reference voltage ($V_{REF}$). Thus, the reference current ($I_1$) equals second reference voltage ($V_{REF}$) divided by resistor ($R_c$) 213. In one embodiment, first npn bipolar transistor ($Q_1$) and second npn bipolar transistor ($Q_2$) 215 have different sizes so that the charging current ($I_{OUT}$) is proportional to the reference current ($I_1$) by a factor of K. When the temperature reading voltage (VDT) exceeds first reference voltage ($V_{REF1}$), reflecting the limit in the temperature of the die temperature indicator (DTI) 102 is reached, first error amplifier 201 adjusts its output voltage that turns on first nMOS transistor 202. The turning on of first nMOS transistor 202 changes the value of resistive divider ratio by bypassing currents to electrical around 111 from second reference voltage ($V_{REF}$) node, thus changing second reference voltage ($V_{REF}$). This change in second reference voltage ($V_{REF}$) is introduced to charging current generator circuit 120 at the non-inverting terminal of second error amplifier 211. The lowering of second reference voltage ($V_{REF}$) reduces the gate voltage of second nMOS transistor 212. Thus, the reference current ($I_1$) is also reduced. As a consequence, the charging current ($I_{OUT}$) will also be reduced.

Figure 3:
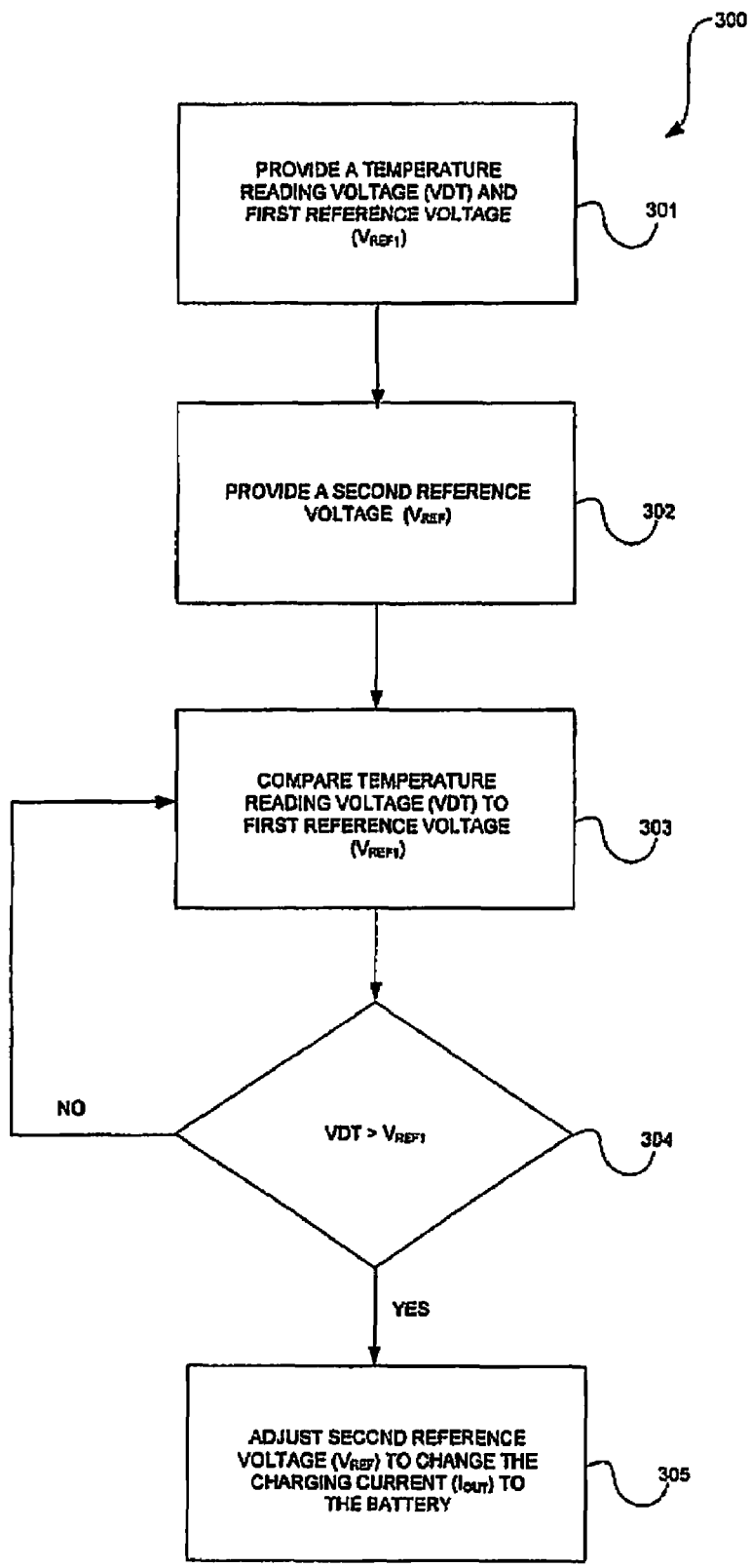
FIG. 3 illustrates a flow chart illustrating a method of temperature control in a batter charger circuit in accordance with an embodiment of the present invention

Now referring to FIG. 3, a flow chart 300 representing a method of providing temperature control for a battery charger circuit is illustrated. Method 300 includes the steps of providing a temperature reading voltage, providing reference voltages that are related to the temperature reading voltage, comparing the first reference voltage ($V_{REF1}$) with the temperature reading voltage (VDT), and adjusting the second reference voltage ($V_{REF}$) in order to reduce the temperature whenever the temperature reading voltage (VDT) surpasses the first reference voltage (VREF1).

Now referring to step 301, a temperature reading voltage (VDT) is provided that is proportional to the die temperature indicator of the battery charger circuit. In reality, step 301 is implemented by connecting a die temperature indicator (DTI) to a sensing resistor ($R_T$) across the two input terminals of an error amplifier such as first error amplifier 201 as shown in FIG. 2 of the present invention.

Referring now to step 302, a first reference voltage ($V_{REF1}$) is provided. Also in step 302, a second reference voltage ($V_{REF}$) is derived from first reference voltage ($V_{REF1}$). Then, a reference current ($I_1$) and charging current ($I_{OUT}$) are generated using the second reference voltage ($V_{REF}$). Step 302 is implemented by connecting first reference voltage ($V_{REF1}$) source to the inverting terminal of first error amplifier 201 as shown in FIG. 1 and FIG. 2.

Referring to step 302, temperature reading voltage (VDT) is compared with first reference voltage ($V_{REF1}$). Step 302 is implemented by first error amplifier 201 connected to die temperature indicator (DTI) 102 and sensing resistor ($R_T$) 103 as shown in FIG. 2 of the present invention.

Referring now to step 304, whenever the temperature reading voltage (VDT) surpasses the first reference voltage ($V_{REF1}$), adjusting the second reference voltage ($V_{REF}$) so that the charging current ($I_{OUT}$) is adjusted. Step 304 is implemented by temperature sensing circuit 110 connected to charging current generator circuit 120 as shown in FIG. 2. If the temperature reading voltage (VDT) is less than the first reference voltage, continue step 303 and the normal operation of battery charger circuit 200.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A battery charger integrated circuit with temperature control, comprising:

a temperature sensor circuit, electrically coupled to receive a first reference voltage (VREF1) and a temperature reading voltage (VDT), operable to generate a second reference voltage (VREF) that is related to said first reference voltage (VREF1), wherein whenever said temperature reading voltage (VDT) surpasses said first reference voltage, a logic output signal is generated to adjust said second reference voltage (VREF); and a charging current generator circuit, electrically coupled to receive said second reference voltage (VREF), operable to generate and continuously adjust a reference current (I1) and a charging current (I) to be linearly proportional to said reference current and to said second reference voltage (VREF).

2. The battery charger integrated circuit of claim 1 wherein temperature sensor circuit further comprises a die temperature indicator, connected to said battery charger integrated circuit, operable to generate a current that is proportional to a temperature measurement of said battery charger integrated circuit.

3. The battery charger integrated circuit of claim 2 wherein said temperature reading voltage (VDT) is linearly proportional to said current.

4. The battery charger integrated circuit of claim 3 wherein said second reference voltage (VREF) is linearly proportional to said first reference voltage (VREF1) and when said temperature reading voltage (VDT) surpasses said first reference voltage (VREF1), said temperature sensor circuit is operable to reduce said second reference voltage (VREF) so that said charging current is reduced.

5. The battery charger integrated circuit of claim 4 wherein said temperature sensor circuit further comprises:
   an error amplifier, electrically coupled to said first reference voltage (VREF1) and said temperature sensing voltage (VDT), operable to generate a logic output signal, whenever said temperature sensing voltage (VDT) surpasses said first reference voltage (VREF1), said error amplifier generates said logic output signal with high level to adjust said second reference voltage (VREF); and
   a n-channel Metal Oxide Semiconductor (nMOS) switch transistor, with gate electrically coupled to receive said logic output signal from said error amplifier; and
   a resistive divider circuit, electrically coupled to said first reference voltage (VREF1), said second reference voltage (VREF), and said nMOS switch transistor, when said logic output signal is high, said nMOS is closed and part of said resistive divider circuit is shorted out and said second reference voltage (VREF).

6. The battery charger integrated circuit of claim 1 wherein said charging current generator circuit further comprises:
   a second error amplifier, electrically coupled to receive said second reference voltage (VREF), operable to generate a second logic output signal, whenever said second reference voltage (VREF) changes due to said temperature measurement increases, said second error amplifier is operable to issue said second logic output signal; and
   a current mirror circuit, electrically coupled to said second error amplifier, operable to generate said reference current and said charging current.

7. The battery charger integrated circuit of claim 6 wherein said current mirror circuit further comprises:
   A first npn bipolar junction transistor with drain flowed over said reference current (I1); and
   A second npn bipolar junction transistor, the emitter of said second npn transistor is electrically coupled to the emitter of said first npn transistor and to an input voltage (VIN), the base of said second npn electrically connected to the base of said first pnp transistor and to the collector of said first pnp transistor, and the collector generates said charging current (I).

8. The battery charger integrated circuit of claim 7 wherein said current mirror circuit further comprises;
   a second n-channel Metal Oxide Semiconductor (nMOS) transistor, with gate electrically coupled to receive said second logic output signal from said second error amplifier, with source electrically connected to another input of said second error amplifier and its drain electrically connected to the drain of said first npn bipolar junction transistor;
   a current reference generator circuit electrically coupled to the source of said second nMOS transistor operable to generate said reference current whenever said second nMOS transistor is turned ON by said second error amplifier.

9. The battery charger integrated circuit of claim 8 wherein said reference current generator circuit further comprises a resistor, electrically coupled to the source of said second nMOS transistor.

10. The battery charger integrated circuit of claim 1 wherein temperature sensor circuit further comprises a die temperature indicator, connected to said battery charger integrated circuit, operable to generate a current that is inversely proportional to a temperature measurement of said battery charger integrated circuit and wherein temperature reading voltage (VDT) varies linearly proportionally with said current.

11. The battery charger integrated circuit of claim 10 wherein said second reference voltage (VREF) is linearly proportional to said first reference voltage (VREF1) and when said temperature reading voltage (VDT) surpasses said first reference voltage (VREF1), said temperature sensor circuit is operable to reduce said second reference voltage (VREF) so that said charging current is reduced.

12. The battery charger integrated circuit of claim 1 wherein said charging current generator circuit is powered by an input voltage (VIN).

13. A method of providing temperature control in a battery charger integrated circuit, comprising:
   providing a temperature reading voltage (VDT) representative of a temperature measurement of said battery charger integrated circuit;
   comparing said temperature reading voltage (VDT) to a first reference voltage (VREF1) to generate a logic output signal;
   providing a second reference voltage (VREF) related to said first reference voltage (VREF1) and said logic output signal, whenever said temperature reading voltage (VDT) surpasses said first reference voltage (VREF1), adjusting said second reference voltage (VREF) to generate and decrease a reference current (I1) and a charging current (I) to be linearly proportional to said reference current (I1) and to said second reference voltage (VREF).

14. The method of claim 13 wherein said providing a temperature reading voltage further comprises:
   taking said temperature measurement of said battery charger integrated circuit from a die temperature indicator; and
   converting said temperature measurement into said temperature reading voltage.

15. The method of claim 13 wherein said temperature reading voltage is linearly proportional to said temperature measurement.

16. The method of claim 13 wherein said temperature reading voltage is inversely proportional to said temperature measurement.

17. A battery charger integrated circuit with temperature control, comprising:
   means for comparing a temperature reading voltage (VDT) to a first reference voltage (VREF1), whenever said temperature reading voltage surpasses said first reference voltage, said comparing means generates a logic output signal;
   means for generating a second reference voltage, coupled to receive said logic output signal to continuously adjusting said second reference voltage (VREF) so as to adjust said charging current (I) that is proportional to said temperature measurement; and analog means for adjusting a charging current, electrically coupled to said second reference voltage means, operating to generate and adjust a reference current (I1) and said charging current (I) that is linearly proportional to said reference current and said second reference voltage (VREF) so as to maintain said temperature reading voltage below said first reference voltage (VREF1).

18. The battery charger integrated circuit of claim 17 wherein said comparing means further comprises:

a resistive network for establishing a linear relationship between said first reference voltage and said second reference voltage; and transistor means, electrically coupled between said comparing means and said value establishing means, for continuously changing the relationship between said first reference voltage and said second reference voltage in said resistive network.

* * * * *